April 30, 1968  M. KATZ  3,380,560
FLOW REGULATOR FOR FLUID WORKING DEVICES
Filed March 4, 1965
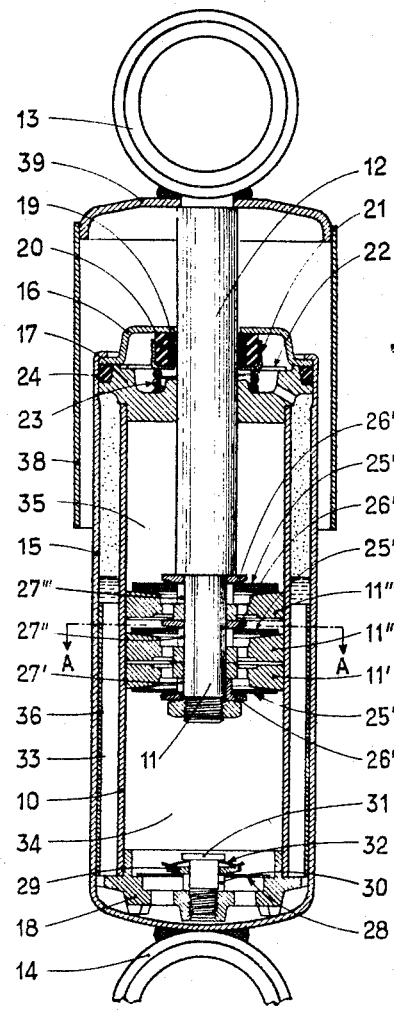
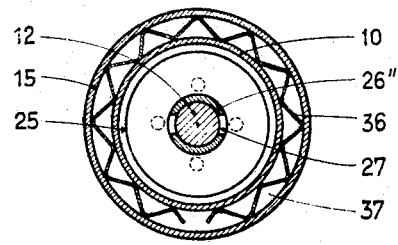
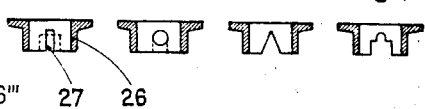
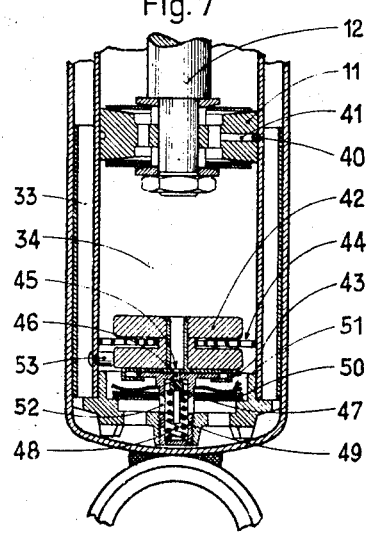
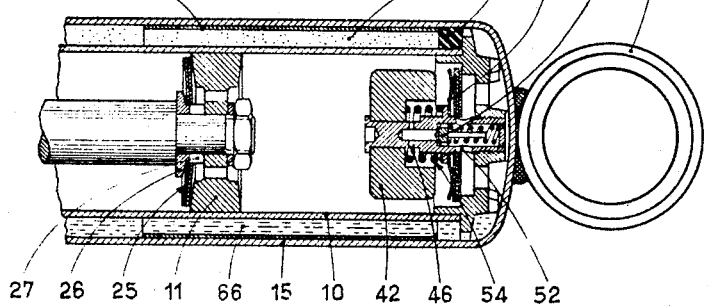
INVENTOR
MAURICE KATZ
BY
Lane, Aitken, Dunner & Ziems
ATTORNEYS United States Patent Office 3,380,560
Patented Apr. 30, 1968

3,380,560
FLOW REGULATOR FOR FLUID
WORKING DEVICES
Maurice Katz, 71 Rue Raynouard, Paris 16, France
Filed Mar. 4, 1965, Ser. No. 437,251
Claims priority, application France, Mar. 11, 1964,
966,889
23 Claims. (Cl. 188—88)

This invention relates to flow regulating systems for fluid working devices. More particularly, it concerns an orifice control arrangement especially adapted for use in hydraulic dampers of the type employed in motor-vehicle suspensions and usually comprising a system of at least two chambers filled with liquid and separated by a piston whose movements are retarded by throttling of the liquid, which is forced to pass from one chamber to the other via restricted conduits governed by suitable members.

The object of the invention is chiefly to improve the method of assembly and regulation of fluid flow in hydraulic dampers at minimum cost with a view towards their better adaptation to the various existing types of suspension, to increase their damping capacity and increase their useful life, a subsidiary object being to enable the suspension to be stiffened on corners or when the brakes are applied, while further advantages will become apparent from the following description.

Among the important features of the present invention are the following:

(1) The damper according to the present invention comprises a liquid-flow governor member having passage orifices whose geometrical shape, which is selected as desired from among a very large number of possibilities, determines the shape of the load-stroke diagram, which may thus be optimally adapted to a given suspension system.

(2) The provision of an improved two-way pressure responsive valve of exceedingly simple construction and yet highly effective to pass fluid at predetermined rates in one direction under relatively high pressure and in the other direction at increased rates when a relatively lower pressure differential exists across the valve.

(3) The piston, together with its valve or valves and governor members, is so designed as to enable a plurality of similar groups to be superimposed, which is equivalent to splitting up the total liquid pressures into stages and throttling it in cascade by way of a plurality of successive valves, resulting in greater capacity without any excessive local heating which would cause the liquid to decompose.

The heat generated may be more easily dissipated by improving heat-conductivity between the internal working tube and the external compensator tube by means of a piece of corrugated sheet-metal which is in contact with both, and prevents any emulsion from being formed while encouraging correct liquid-aspiration in the case of a horizontal damper.

(4) A composite floating package with a friction ring made of a wear-resistant material, such as polytetrafluoroethylene for example, completes the means used to impart longer life to the damper.

(5) A weight which reacts by inertia to deceleration on corners or upon brake application masks the valve which normally fixes the resistance to compression, and thus diverts the flow of liquid to a second and stiffer valve, as a result suddenly increasing this resistance, an effect which is particularly advantageous in the case of a suspension which is too soft in relation to the load being carried.

In the appended drawing, which is given solely as an example of a preferred practical form of embodiment:

FIGURE 1 shows a longitudinal section through a telescopic damper.

FIGURE 2 is a transverse section along A—A in FIGURE 1.

FIGURES 3, 4, 5 and 6 show four rings comprising grooves or apertures of different geometrical shapes and constituting the liquid-flow governor members utilizable in the dampers of the present invention.

FIGURE 7 is a longitudinal section through the lower part of a modified structure in accordance with the present invention.

FIGURE 8 shows a longitudinal section through part of a telescopic damper which works horizontally.

The damper of FIGURES 1 and 2 comprises a tube 10 entirely filled with liquid, wherein there moves a multi-stage piston 11 is made up of three similar elements 11', 11" and 11''', which are slightly spaced apart, and two of which are oriented in the same direction and one, the lowest, in the opposite direction. The multi-stage piston 11 is fitted to a rod 12 which is secured to the chassis of the vehicle by way of the ring 13. A second ring 14, which is fixed to the axle and welded to the bottom of the tube 15, transmits movements from the wheels, and the tube 15 is closed at the top by a plug 16. The tube 10 is closed at the top by an annular member 17 and at the bottom by a base 18. The rod 12, which slides freely in the member 17, passes through a fluid-tight packing 19, which is made of a particularly wear-resistant material (such as polytetrafluoroethylene) and is surrounded by an elastic rubber ring 20. The latter is set in an elastic cup 21 made of a number of lugs turned up from a washer 22 cut out in star fashion which bears against the annular member 17 by way of other elastic lugs or a spring 23, with a certain amount of lateral clearance and pressure on the plug 16. A fixed packing 24 provides a fluid-tight seal between the tube 15 and the plug 16 fixed to it by crimping or any other known process.

Each of the three elements 11', 11" and 11''' of the multi-stage piston 11 is perforated with large communicating holes and comprises on one of its two faces, which is slightly concave, a valve 25', 25", 25''' made up of one or more elastic washers which bear by way of their opposite faces against flanged rings 26', 26" and 26''' comprising apertures 27', 27", 27''' on their cylindrical body portions which serve as guides and form liquid passages of variable cross-section.

A similar group of one or more elastic washers 28 and rings 29 having apertures 30 is fitted with the aid of a screw 31 and a weak spring 32 to the base 18, closing the communication which the latter sets up between the annular chamber 33 and the lower chamber 34 separated by the piston 11 from the upper chamber 35.

A piece of corrugated sheet-metal 36, extending over all or only part of the length between the tubes 10 and 15, divides the annular chamber 33 into a plurality of longitudinal cavities 37. A tube 38 fitted to a cap 39 protects the rod 12 and the packing 19 from foreign bodies being thrown up and from the entry of dust.

The damper operates in the following manner: When the spring of the suspension system relaxes, liberating the energy stored in the course of a preceding compression movement, the multi-stage piston 11 rises and compresses the liquid in the chamber 35, and the pressure developed by the liquid gives rise to the force which opposes this movement and absorbs this energy by transforming it into heat. In fact, the liquid in the chamber 35 can escape only by passing into the lower chamber via the multi-stage piston 11, first of all deforming the elastic washers 25''' in order to uncover the apertures 27''' and then flow through the apertures 27'' while deforming the elastic washers 25'', finally passing through the last element 11', deforming the washer 25' in order to escape via its external edge. Each time the liquid passes through, one or more elastic washers have to be deformed and extra pressure is added, so that the total pressure in the chamber 35 is the sum of the pressures which the elastic washers 25', 25'' and 25''' would set up separately. It follows from this that leaks between the piston 11 and the cylinder 10 will be very small, since each of the elements 11', 11'' and 11''' has to withstand a pressure difference equal to only part of the total pressure. As a result, the total pressure can reach a much larger value than in conventional dampers, leading to greater capacity.

Likewise, the fact that throttling is split up via successive valves in cascade greatly reduces the considerable local heating which the liquid undergoes upon being forced through the small passages generally presented to it by the valves, and which spoils its properties to the extent of making the damper useless after a more or less long period, which reduction results in longer life for a given capacity.

It will easily be understood that the deformation of the elastic washers 25''' and 25'' will be greater or less not only according to the quantity of liquid which would have to pass through the apertures 27''' and 27'', that is to say according to the speed of the piston 11, but also according to the cross section of the apertures 27''' and 27'', which amounts to saying their shape and number. It thus becomes possible, with very simple means, for the damper to be given any desired curve of pressure or resistance as a function of speed by carefully selecting profiles for the apertures 27 in the rings 26''' and 26''.

FIGURES 3, 4, 5 and 6 show various aperture profiles by way of example. The rectangular aperture 27 flush with the bearing face on the flange of the washer 26 in FIGURE 3 will give a passage cross-section increasing in proportion to the amount by which the elastic washers yield, starting from zero yield, thus giving a curve of pressure as a function of speed which is very smooth and regular and starts from zero. On the contrary, the rectangular aperture indicated in dotted line, which is wider and is not flush with the flange bearing face, will give a flatter curve starting from a quite high value, not zero. A simple round hole (FIGURE 4) or a rounded groove flush with the washer flange bearing face will give a curve which is slightly steeper towards the ends, a triangle (FIGURE 5) will give a curve which is very steep towards the ends and flatter towards the middle, almost rectangular, and a mixed half-round and rectangular profile (FIGURE 6) will give a curve which is somewhat rounded towards the ends but flat in the middle. This system of rings having apertures of profiles which may be varied as desired may naturally be used in conjunction with multi-stage pistons comprising elastic washers of variable number and thickness fitted freely without any tension or with a definite initial deflection, and enables regulation to be carried out a numerous combinations capable of suiting the majority of suspension systems which are encountered.

It should be noted that flow via the external edge of an elastic washer does not set up much pressure unless it has been fitted with a certain amount of initial deflection, since the peripheral passage cross-section is very large for a very small lift at the edge, while the lift, or deflection, at the center of such a washer would have to be very much greater in order to give an equivalent passage cross-section, above all when this passage is provided only by deliberately restricted apertures.

However, this small amount of throttling remains very useful in some cases, since it makes the damper smoother and quieter.

When the piston 11 moves in the opposite direction, that is to say downwards, for example when the wheel of the vehicle passes over a bump, some of the liquid in the chamber 34 passes into the chamber 35, first of all via the aperture 27', lifting the elastic washer 25', then via the external edge of the washers 25'', and finally via the external edge of the washers 25'''. As in the preceding movement, there is extra hydraulic pressure each time the liquid passes through. The deflection due to deformation and the strength and number of the washers determine the value of pressure, giving the possibility of wide variations in regulation.

The volume of liquid corresponding to the amount by which the rod 12 is driven inwards escapes into the chamber 33 via the apertures 30 which are uncovered in the ring 29 by the washer 28 as it deforms under the action of the pressure.

A volume of liquid compensating exactly for that of the rod 12 will return to the chamber 34 upon each relaxation movement, lifting the elastic washer 28 without deforming it, together with the ring 29 which slides freely upwards on the screw 31 against the action of the weak spring 32.

The modification shown in FIGURE 7 comprises a one-piece piston 11 having a circular channel 40 communicating via one or more holes 41 with the free space between the two groups of elastic washers which close the piston 11 on both sides, so that the liquid is placed under pressure and throttled in two stages.

A weight 42 mounted on a support 43 is normally held in a central position by a spiral spring 44, so that its orifice 45 coincides with the orifice 46 blocked by a valve 47 which is brought to bear by a small spring 48 inside the screw 49. One or more elastic washers 50 are held by a weak spring 51, and when they lift they allow the liquid compensating for the volume of the rod 12 to return to the chamber 34, and in the opposite direction when they are deformed under very heavy pressure and uncover the apertures 52 they allow the compensating liquid to pass into the annular chamber 33.

Normally, when a compression movement occurs the compensating liquid corresponding to the volume of that part of the rod 12 which is driven inwards passes through the orifices 45 and 46, pushing back the valve 47, which offers appreciably less resistance than the elastic washers 50, with the result that the resistance of the damper is less. However, when the brakes are applied or there is a sudden change of direction on a corner, the weight 42 moves forward by inertia, or in general in the direction of its preceding movement, against the action of the weak spiral spring 44, and masks the orifice 46 of the valve 47, so that the compensating liquid is obliged to pass through the apertures 52 after deforming the elastic washers 50, with the result that the damper becomes much stiffer. The weight may be prevented from moving in one or more undesired directions by abutments 53.

It may be highly advantageous in numerous cases for the damper to be stiffened in this fashion in the direction in which the suspension is compressed. This still applies even when the damper is disposed horizontally, as indicated in the modified structure in FIGURE 8. In the example of this embodiment of a horizontal damper, there is a one-piece piston 11 equipped with a single valve made up of elastic washers 25, preferably fitted with a certain amount of initial deflection, and a single ring 26 containing apertures 27, so that work in extension is carried out by throttling liquid through the internal bore of the elastic washers 25 and the apertures 27, and work in compression by throttling liquid via the external edge of these same elastic washers 25.

However, the value of resistance in compression is still determined, as in the preceding case, by the position of the weight 42, which normally uncovers the orifice 46 of the valve 47 by virtue of the spring 54, thus giving fairly weak resistance. However, when deceleration occurs in the direction of travel or a direction near thereto, the weight acts by its inertia to mask the orifice 46, stiffening the damper, which can thus oppose excessive deflection in the suspension. When the vehicle is to move forward from right to left in FIGURE 8, it would suffice to dispose the orifice 46 and the spring 54 on the lefthand side of the weight 42 in order to obtain the same result.

In order to prevent the damper which is intended to work horizontally from aspirating the air in the upper part 55 of the annular chamber 33, a packing 56 is provided between the tubes 10 and 15 over the upper part of the circumference only, so to enable the liquid to enter at the bottom. The piece of corrugated sheet-metal 36 holds this packing 56 in place and forms cavities which prevent liquid entering at the bottom from mixing with air because of vibration. This piece of corrugated sheet-metal 36 also serve to cool the whole of the damper or the hottest part only thereof, in the case of instruments giving particularly stiff regulation.

In addition to the many significant advantages possessed by the damper structures described above, an extremely important advantage resides in their elimination of the concentricity problems associated with conventional mechanisms. More specifically, conventional mechanisms require by their very nature well machined parts according to closely held tolerances so that precision fits between piston rods and guides and cylinders will be obtained. This, in turn, requires expensive high precision machinery. The dampers of the present invention, on the other hand, permit the use of die-cast materials because they will tolerate a reasonable degree of lateral floating of the throttling elements. As a result, high precision machinery is not required and, in fact, manufacture of parts by powder metallurgy techniques is made practicable.

Although the present invention is particularly suited for use in hydraulic dampers of the type shown and described, it is contemplated that certain features of the invention lend it to application in other environments. For example, the valve assembly 25 might be used to limit discharge pressure in pulsating pumps wherein a certain quantity of liquid is to be discharged at each stroke without having to withstand significant back-pressure between strokes. Also, the valve assembly could be used in various other fluid motor applications. Accordingly, it will be appreciated that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic damper adapted to be connected between relatively movable members of a vehicle suspension system, said damper comprising in combination: a generally cylindrical housing having means for connection to one of said relatively movable members; a working cylinder disposed concentrically in said housing and spaced therefrom to establish an annular fluid chamber between said cylinder and said housing; first and second closure means on each end respectively of said cylinder; a piston positioned for reciprocal movement in said cylinder and defining with said cylinder and said first and second closure means, first and second working chambers respectively, one on each side of said piston and each being filled with hydraulic fluid; a piston rod connected at one end to said piston and having means at its other end for connection to the other of the relatively movable members, said piston rod extending through said second working chamber and through said second cylinder end closure means; seal means between said piston rod and said second end closure means; at least one aperture through said piston to establish a fluid flow path between said working chambers; valve means on said piston to effect a predetermined cross-sectional area of said flow path for a given fluid pressure differential between said working chambers, said valve means comprising means defining a surface extending in the direction of piston movement, said surface having a shaped recess formed therein, said recess defining an area of predetermined shape on said surface and being of uniform radial depth throughout said area, and means arranged in sealing engagement with said surface and with said piston for normally preventing fluid flow through said recess and said aperture but being movable along said surface upon the existence of a pressure differential between said working chambers to establish a fluid flow path through said piston aperture and said recess, the cross-sectional area of said flow path being a function of the shape defined by said recess on said surface and the extent of movement of said last-mentioned means along said surface as a result of said pressure differential; further valve means in said first cylinder end closure means to provide for restricted flow of hydraulic fluid from said first working chamber into said annular chamber as displaced by said piston rod and for relatively unrestricted flow of said displaced fluid from said annular chamber to said first working chamber, said further valve means including an inertial element operable to change the characteristics of fluid flow between said first working chamber and said annular chamber in accordance with accelerations incurred by the vehicle on which the damper is adapted to be mounted; and means for conducting heat from said cylinder across said annular chamber to said housing.

2. The apparatus recited in claim 1 wherein said means for conducting heat across said annular chamber comprises corrugated sheet material, the corrugations of which extend longitudinally of the annular chamber and contact the exterior surface of said cylinder on one side and the interior surface of said housing on the other side.

3. The apparatus recited in claim 2 in which said housing is adapted to be horizontally disposed and including further seal means between said corrugated sheet material and said first end closure, said further seal means extending over the upper portion of said annular chamber whereby hydraulic fluid passing through said first end closure is constrained to the lower portion of said annular chamber.

4. A piston assembly for establishing a pair of working chambers in a hydraulic damping device, said assembly comprising: a piston rod having a pair of axially spaced abutment means near the end thereof adapted to extend within the working chambers; at least one annular piston element mounted on said rod between said abutments, at least one side of said piston element being dish-shaped to establish a central concavity therein and at least one piston aperture extending through said piston element in said concavity; a spool-shaped ring on said rod between said abutments and said one side of said piston element, said ring having a cylindrical wall portion seated in said concavity and a flanged portion spaced from the bottom of said concavity, said cylindrical wall portion having a ring aperture extending therethrough and defining an area of predetermined peripheral shapes on the surface of said cylindrical wall portion, said ring aperature also being of uniform radial depth through said area, said ring aperture and said piston aperture establishing a fluid flow path across the piston; at least one resilient washer overlying said concavity and underlying said flange portion whereby said washer normally coacts with said flanged portion and said piston element to close said flow path but deforms about its inner annular edge upon fluid pressure build-up on said one side of said piston element to vary the cross-sectional area of said flow path in accordance with the shape of said ring aperture and deforms about its outer peripheral edge upon fluid pressure build-up on the other side of the piston element to establish a flow path cross-sectional area substantially equal to the cross-sectional area of said piston element aperture.

5. The apparatus recited in claim 4 in which said assembly includes a plurality of said piston elements and a corresponding plurality of said rings and washers respectively, at least two of said piston elements having the dish-shaped sides facing in the same direction to establish a cascade flow path across said piston elements.

6. The apparatus recited in claim 4 including a plurality of resilient washers overlying said concavity and underlying said flanged portion.

7. The apparatus recited in claim 5 including a different number of washers coacting with each of said two piston elements and each of the spool-shaped rings associated therewith, respectively.

8. An interchangeable valve element adapted to be mounted on the piston and piston rod of a hydraulic damper to coact with a resilient washer means for providing a flow path of variable cross-section across the piston, said element comprising: a spool-shaped ring having a cylindrical wall portion receivable over the piston rod and engageable with a surface of the piston and a flange portion adapted to be spaced from the piston surface, said ring having an aperture extending through the cylindrical wall portion thereof and shaped to establish with said piston rod and said washer means predetermined flow characteristics under given damper operating conditions.

9. The valve means recited in claim 8 in which said aperture is rectangular.

10. The valve means recited in claim 8 in which said aperture is circular.

11. The valve means recited in claim 8 in which said aperture is triangular.

12. The valve means recited in claim 8 in which said aperture is partially circular and partially rectangular.

13. A hydraulic damper for use in a vehicle suspension system comprising: a cylinder having first and second closure means on each end thereof respectively; a piston positioned for reciprocal movement in said cylinder and defining with said cylinder and said first and second closure means, first and second working chambers respectively, one on each side of said piston and each being filled with hydraulic fluid; a piston rod connected to said piston and extending through said second working chamber and said second end closure means; at least one aperture through said piston to establish a fluid flow path between said working chambers; valve means on said piston to effect a predetermined cross-sectional area of said flow path for a given fluid pressure differential between said working chambers, said valve means comprising means defining a surface extending in the direction of piston movement, said surface having a shaped recess formed therein, said recess defining an area of predetermined shape on said surface and being of uniform radial depth throughout said area, and means arranged in sealing engagement with said surface and with said piston for normally preventing fluid flow through said recess and said aperture but being movable along said surface upon the existence of a pressure differential between said working chambers to establish a fluid flow path through said piston aperture and said recess, the cross-sectional area of said flow path being a function of the shape defined by said recess on said surface and the extent of movement of said last-mentioned means along said surface as a result of said pressure differential; means defining a fluid reservoir in fluid communication with said first working chamber through said first end closure means; and valve means for regulating fluid flow from said first working chamber to said reservoir and including means defining an orifice in said first end closure means, an inertia element movable to an active position closing said orifice in response to vehicle accelerations from an inactive position opening said orifice, and means for restoring said inertia element to said inactive position.

14. The apparatus recited in claim 13 in which said valve means for regulating fluid flow from said first working chamber to said reservoir includes further, means operative when said orifice is closed to establish a fluid flow path through said first end closure of a predetermined cross-sectional area for a given fluid pressure in said first working chamber.

15. The apparatus recited in claim 13 in which said orifice defining means comprises a generally horizontal flat surface, said orifice being located centrally of said surface and in which said inertia means includes a central opening registrable with said orifice in said inactive poston.

16. The apparatus recited in claim 15 in which said restoring means comprises a spiral spring between said inertia element and said cylinder.

17. The apparatus recited in claim 13 in which said orifice defining means comprises a closed tubular member disposed on a generally horizontal axis, said orifice extending radially through said tubular member and in which said inertia element is a weight slidably received about said tubular member and axially displaced from said orifice in said inactive position.

18. A damper device comprising: piston means; means movable relative to said piston means and defining therewith a pair of working chambers one on each side of said piston means and each being filled with working fluid, said piston means including at least one aperture extending therethrough to establish fluid communication between said working chambers and valve means for regulating fluid flow through said piston aperture, said valve means comprising means defining a surface extending in the direction of piston movement, said surface having a shaped recess formed therein, said recess defining an area of predetermined shape on said surface and being of uniform radial depth throughout said area, and means arranged in sealing engagement with said surface and with said piston for normally preventing fluid flow through said recess and said aperture but being movable along said surface upon the existence of a pressure differential between said working chambers to establish a fluid flow path through said piston aperture and said recess, the cross-sectional area of said flow path being a function of the shape defined by said recess on said surface and the extent of movement of said last-mentioned means along said surface as a result of said pressure differential.

19. The apparatus recited in claim 18 including an annular ledge on each side of said piston and an annular flange projecting from said surface on each side of said piston, said ledge being spaced axially from said flange and wherein said means for normally preventing fluid flow through said recess and said aperture comprises at least one resilient washer between said flange and said ledge on each side of said piston.

20. The apparatus recited in claim 19 including a larger number of said washers on one side of said piston than on the other side thereof whereby the regulation of fluid flow between said chambers effects a higher resistance to piston movement in one direction than the other.

21. The apparatus recited in claim 18 including a piston rod to support said piston and in which said means defining said working chambers comprises a generally cylindrical housing having closure means at one end comprising a pair of spaced annular members hermetically sealed at their outer peripheries to each other and to said housing, and seal means between said piston rod and said second end closure means, said seal means comprising a packing having a lining of low friction, wear-resistant material in engagement with said piston rod surrounded by an elastic ring, together with means for biasing said packing against said piston rod and against the outer one of said spaced annular members.

22. The apparatus recited in claim 21 in which said lining is formed of polytetrafluoroethylene and in which said elastic ring is formed of rubber.

23. The apparatus recited in claim 21 in which said means for biasing said packing comprises cup shaped member surrounding said elastic ring and having resilient lugs to bear against the inner one of said annular members.

References Cited

UNITED STATES PATENTS

| | | | |
|---|---|---|---|
| 982,008 | 1/1911 | Knapp | 188—88 |
| 2,152,661 | 4/1939 | Paton | 188—100 |
| 2,521,202 | 9/1950 | Cloudsley | 188—88 |
| 2,576,658 | 11/1951 | Werner | 188—100 |
| 2,699,844 | 1/1955 | McIntyre | 188—88 |
| 2,740,500 | 4/1956 | Brundrett et al. | 188—88 |
| 2,784,013 | 3/1957 | Groen | 277—165 |
| 3,127,958 | 4/1964 | Szostak | 188—100 X |
| 3,199,636 | 8/1965 | De Carbon | 188—96 |
| 3,203,511 | 8/1965 | Long | 188—100 |

FOREIGN PATENTS

| | | |
|---|---|---|
| 526,041 | 2/1954 | Belgium. |
| 609,018 | 11/1960 | Canada. |
| 1,298,511 | 6/1962 | France. |
| 1,376,487 | 9/1964 | France. |

MILTON BUCHLER, *Primary Examiner.*

G. E. HALVOSA, *Assistant Examiner.*

UNITED STATES PATENT OFFICE
CERTIFICATE OF CORRECTION

Patent No. 3,380,560                          April 30, 1968

Maurice Katz

It is certified that error appears in the above identified patent and that said Letters Patent are hereby corrected as shown below:

Column 2, line 15, "of" should read -- in --; line 17, cancel "is"; line 32, after "made" insert -- up --. Column 5, line 18, "serve" should read -- serves --. Column 8, lines 14 and 15, "poston" should read -- position --.

Signed and sealed this 23rd day of September 1969.

(SEAL)
Attest:

Edward M. Fletcher, Jr.                      WILLIAM E. SCHUYLER, JR.
Attesting Officer                              Commissioner of Patents